(12) United States Patent
Chandaker

(10) Patent No.: US 9,813,690 B2
(45) Date of Patent: Nov. 7, 2017

(54) SHAPE AND DICHROMATIC BRDF ESTIMATION USING CAMERA MOTION

(71) Applicant: NEC Laboratories America, Inc., Princeton, NJ (US)

(72) Inventor: Manmohan Chandaker, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 359 days.

(21) Appl. No.: 14/511,649

(22) Filed: Oct. 10, 2014

(65) Prior Publication Data

US 2015/0256810 A1  Sep. 10, 2015

Related U.S. Application Data

(60) Provisional application No. 61/948,728, filed on Mar. 6, 2014, provisional application No. 61/948,729, filed on Mar. 6, 2014.

(51) Int. Cl.
*H04N 13/02* (2006.01)
*G01B 11/24* (2006.01)
*G06T 15/50* (2011.01)
*G06T 7/579* (2017.01)

(52) U.S. Cl.
CPC ......... *H04N 13/0203* (2013.01); *G01B 11/24* (2013.01); *G06T 7/579* (2017.01); *G06T 15/506* (2013.01); *G06T 2207/20228* (2013.01)

(58) Field of Classification Search
CPC . H04N 13/0203; G06T 7/0071; G06T 15/506; G06T 2207/20228; G01B 11/24
See application file for complete search history.

(56) References Cited

U.S. PATENT DOCUMENTS

| | | | |
|---|---|---|---|
| 6,853,745 B1 * | 2/2005 | Jacobs | G06K 9/00275 382/118 |
| 2008/0123937 A1 * | 5/2008 | Arias Estrada | G06T 7/002 382/154 |
| 2008/0158239 A1 * | 7/2008 | Lamy | G06F 3/016 345/581 |
| 2009/0052767 A1 * | 2/2009 | Bhalerao | G06T 17/20 382/154 |
| 2009/0226049 A1 * | 9/2009 | Debevec | G06T 15/50 382/118 |
| 2012/0268571 A1 * | 10/2012 | Debevec | G06T 7/0073 348/48 |

* cited by examiner

*Primary Examiner* — Kate Luo
(74) *Attorney, Agent, or Firm* — Joseph Kolodka

(57) ABSTRACT

A method for shape and material recovery of an object observed under a moving camera by detecting a change in image intensity induced by motion to corresponding variation in surface geometry and dichromatic reflectance; receiving a sequence of three camera motions to yield a linear system that decouples shape and bidirectional reflectance distribution functions (BRDFs) terms; applying linearities in differential stereo relations to recover shape from camera motion cues, with unknown lighting and dichromatic BRDFs; and recovering unknown shape and reflectance of the object with dichromatic BRDF, using camera motion cues.

16 Claims, 7 Drawing Sheets

FIG. 3

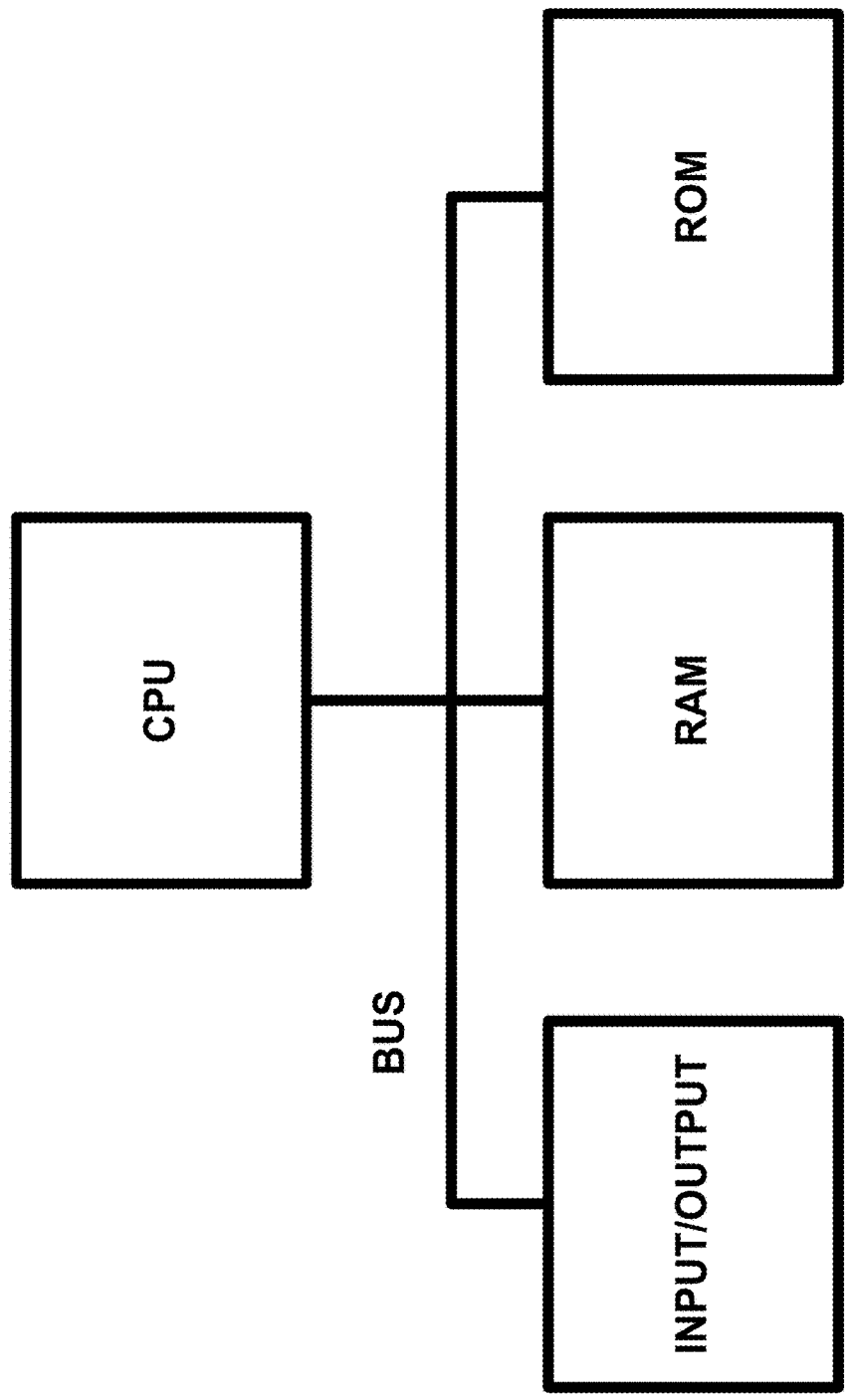

SHAPE AND DICHROMATIC BRDF ESTIMATION USING CAMERA MOTION

The present application claims priority to Provisional Application Nos. 61/948,728 and 61/948,729, both filed on Mar. 6, 2014, and application Ser. No. 14/511,617 filed Oct. 10, 2014, the contents of which are incorporated by reference.

BACKGROUND

Shape and lighting interact in complex ways through the bidirectional reflectance distribution function (BRDF) to produce the variety of images around us. Shape recovery with unknown BRDF and lighting is traditionally considered hard, while their joint recovery is deemed severely ill-posed.

Camera motion cues for shape recovery have been extensively studied within the purview of multiview stereo. It is well-known from early works that the Lambertian reflectance assumed by multiview stereo has limitations. Several approaches have been proposed for shape recovery with general BRDFs, such as Helmholtz reciprocity for stereo and intensity profiles for photometric stereo.

For BRDF estimation, parametric models have a long history. Non-parametric and data-driven approaches are popular for their representation power, but require a large amount of data or rely on complex estimation whose properties are hard to characterize. Semiparametric models have also been proposed for BRDF editing and estimation.

SUMMARY

In one aspect, a method for shape and material recovery from motion includes model the correct dichromatic dependence of surface reflectance on surface normal, lighting and viewing directions to derive a differential stereo relation; determine a rank deficiency in a sequence of differential stereo relations and use the rank deficiency to handle complex bidirectional reflectance distribution functions (BRDFs); estimating BRDF-derivatives from the differential stereo relations to recover the complex BRDF; and reconstruct depth of objects that reflect light without the BRDFs for shape recovery.

In another aspect, a framework for the joint recovery of the shape and reflectance of an object with dichromatic BRDF, using motion cues is disclosed. Three (small or differential) motions of the camera suffice to yield a linear system that decouples shape and BRDF.

Advantages of the above systems may include one or more of the following. The benefit is that precise limits on shape and reflectance recovery using motion cues may be derived. We show that shape may be recovered for unknown isotropic BRDF and light source. Simultaneous reflectance estimation is shown ambiguous for general isotropic BRDFs, but possible for restricted BRDFs representing common materials like metals, plastics and paints. The practical benefit of the decoupling is that joint shape and BRDF recovery need not rely on alternating methods, or restrictive priors. Further, our theory yields conditions for the joint estimability of shape, albedo, BRDF and directional lighting using motion cues. Surprisingly, such problems are shown to be well-posed even for some non-Lambertian material types. Experiments on measured BRDFs from the MERL database validate our theory.

BRIEF DESCRIPTION OF THE DRAWINGS

FIGS. 1-6 shows exemplary processes for Shape and Dichromatic BRDF Estimation Using Camera Motion.

FIG. 7 shows an exemplary system to perform Shape and Dichromatic BRDF Estimation Using Camera Motion.

DESCRIPTION

A system is disclosed for recovering both the unknown shape and reflectance of an object with dichromatic BRDF, using motion cues. Using the (small or differential) motion of either the object or the camera, intensity change depends on motion through a relation that is linear in shape, reflectance and lighting. A sequence of either four object motions or three camera motions suffices to yield a linear system that decouples shape and BRDF terms, obviating the need for unstable or expensive alternating estimation. Precise theoretical conditions may be delineated that place limits on shape and reflectance recovery using motion cues, regardless of choice of estimation method. While shape may be recovered for a full isotropic BRDF even with unknown lighting for both object and camera motions, reflectance estimation is shown to be ambiguous using motion cues alone. BRDFs representing common materials like metals, plastics and paints can be recovered, even with unknown shape. Our system generalizes or extends prior works that assume monochromatic BRDF for shape recovery, or estimate BRDF using a single image or known shape. Experiments on real measured BRDFs from the MERL database validate our system.

Figure 1:
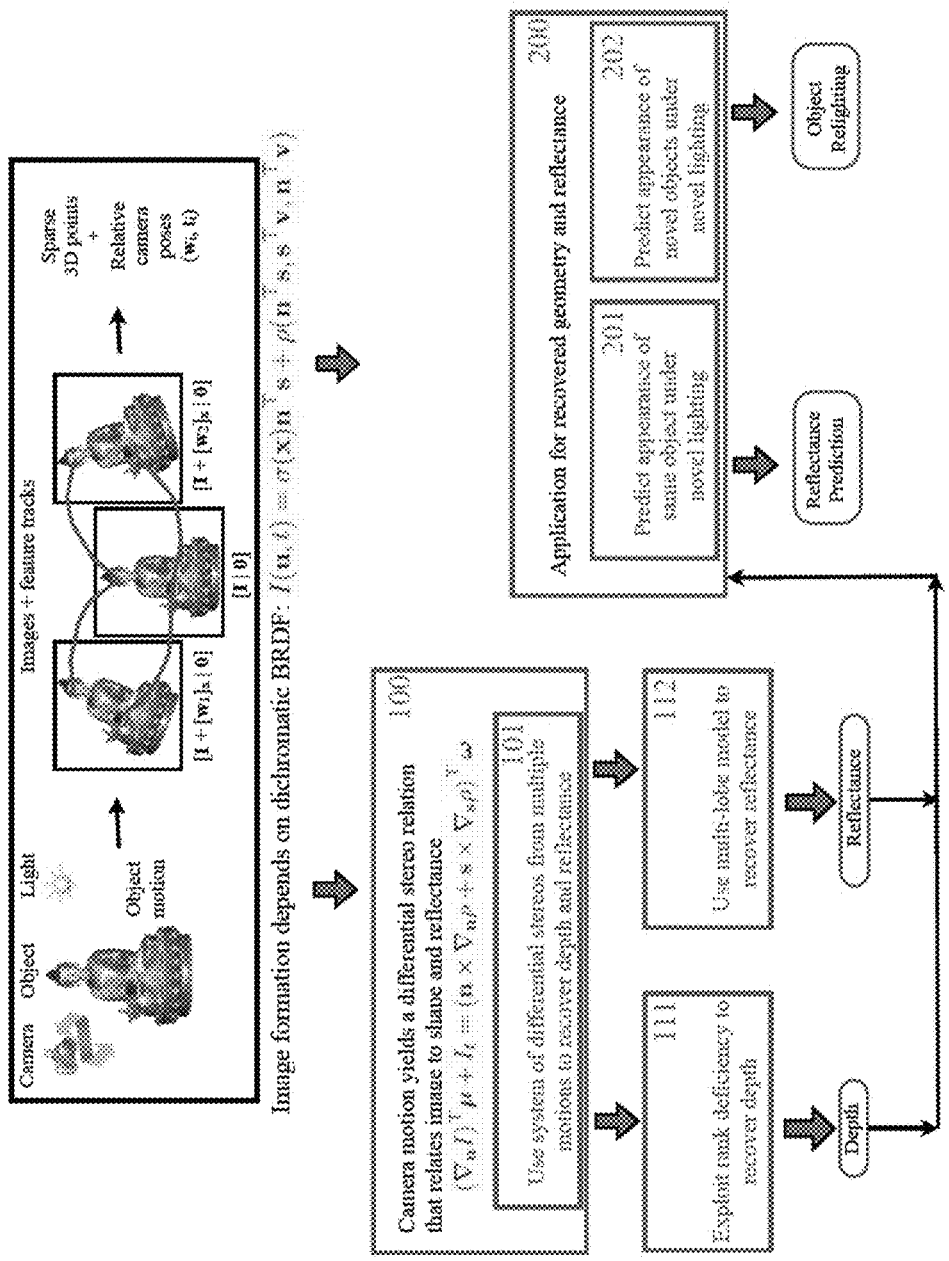
Figure 2:
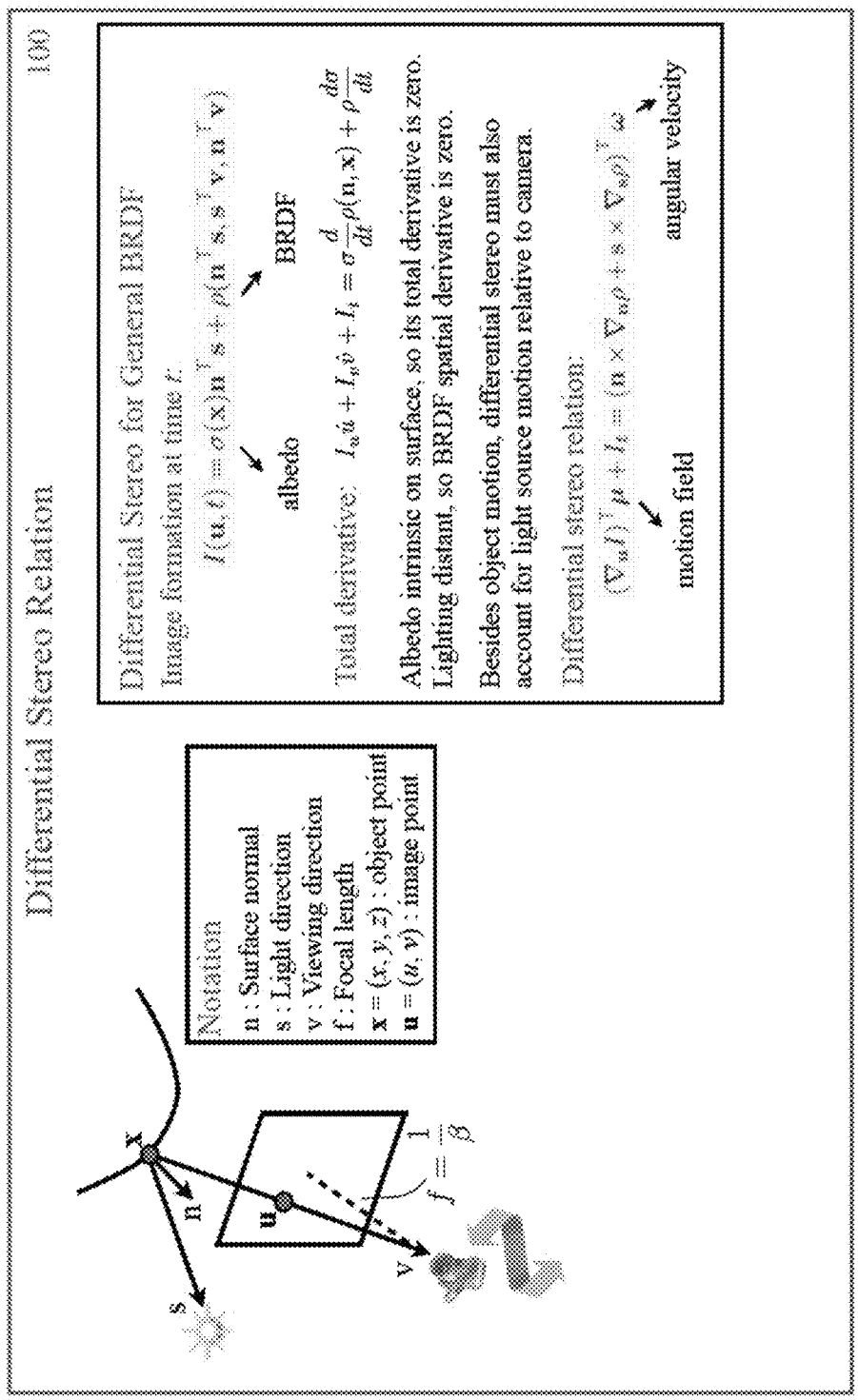
Figure 3:
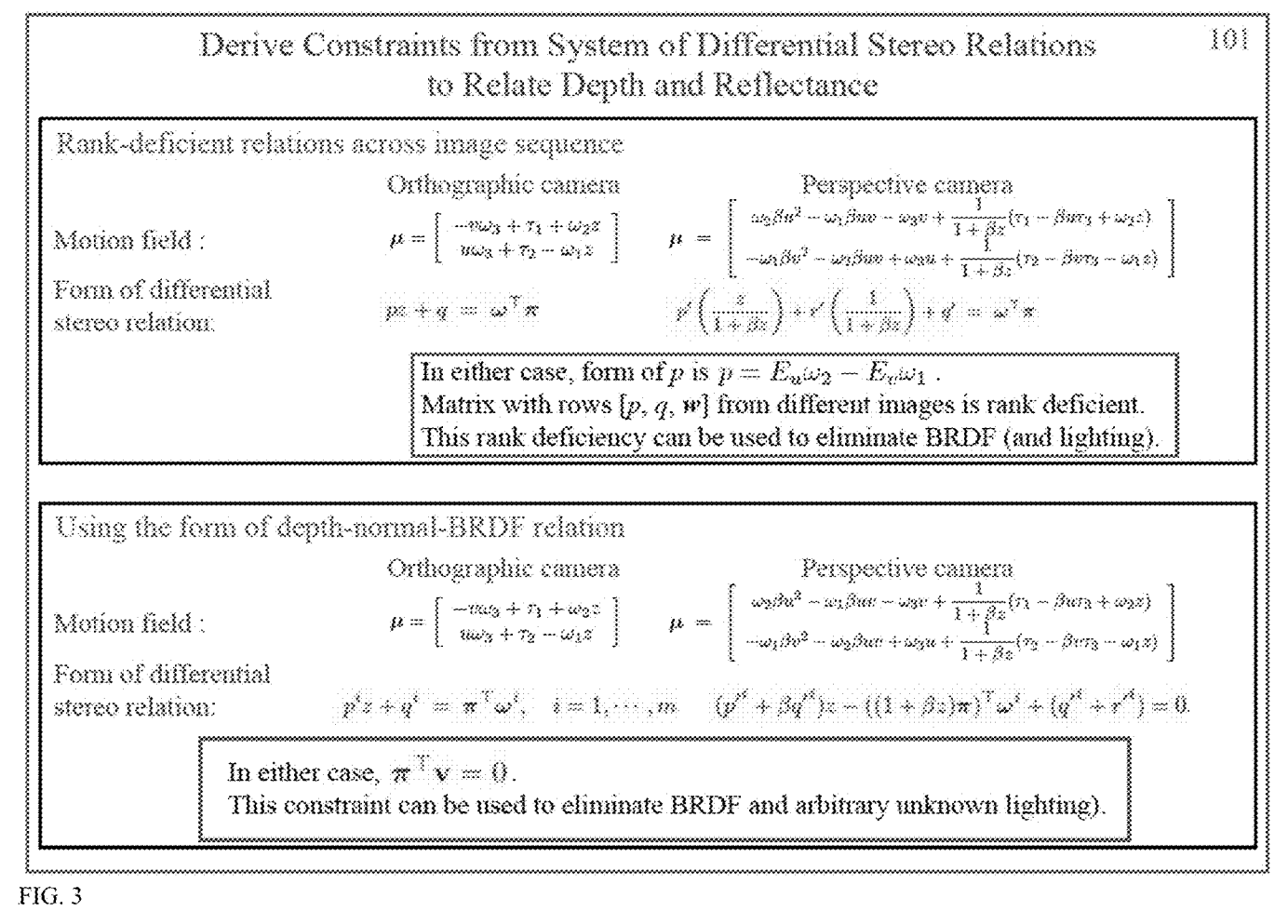
Figure 4:
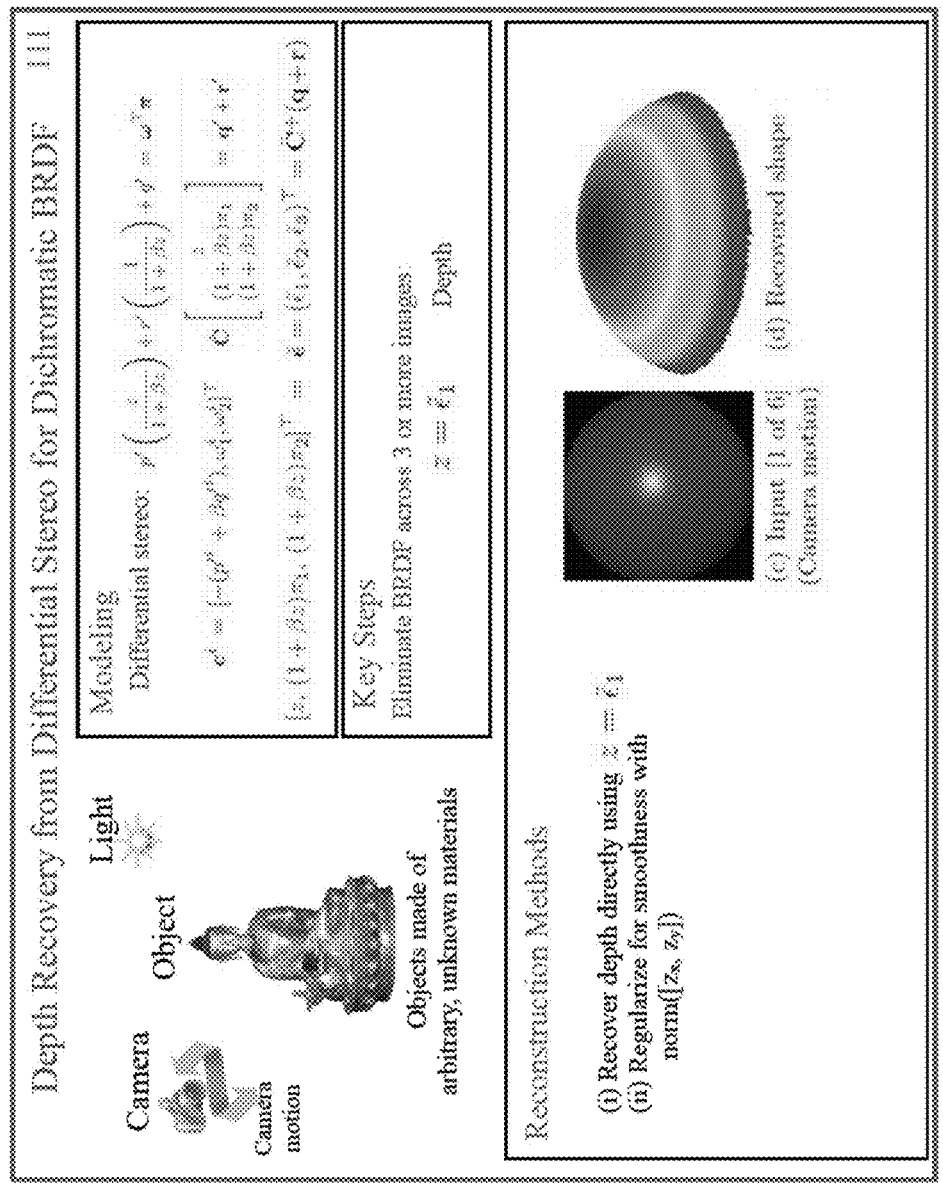
Figure 5:
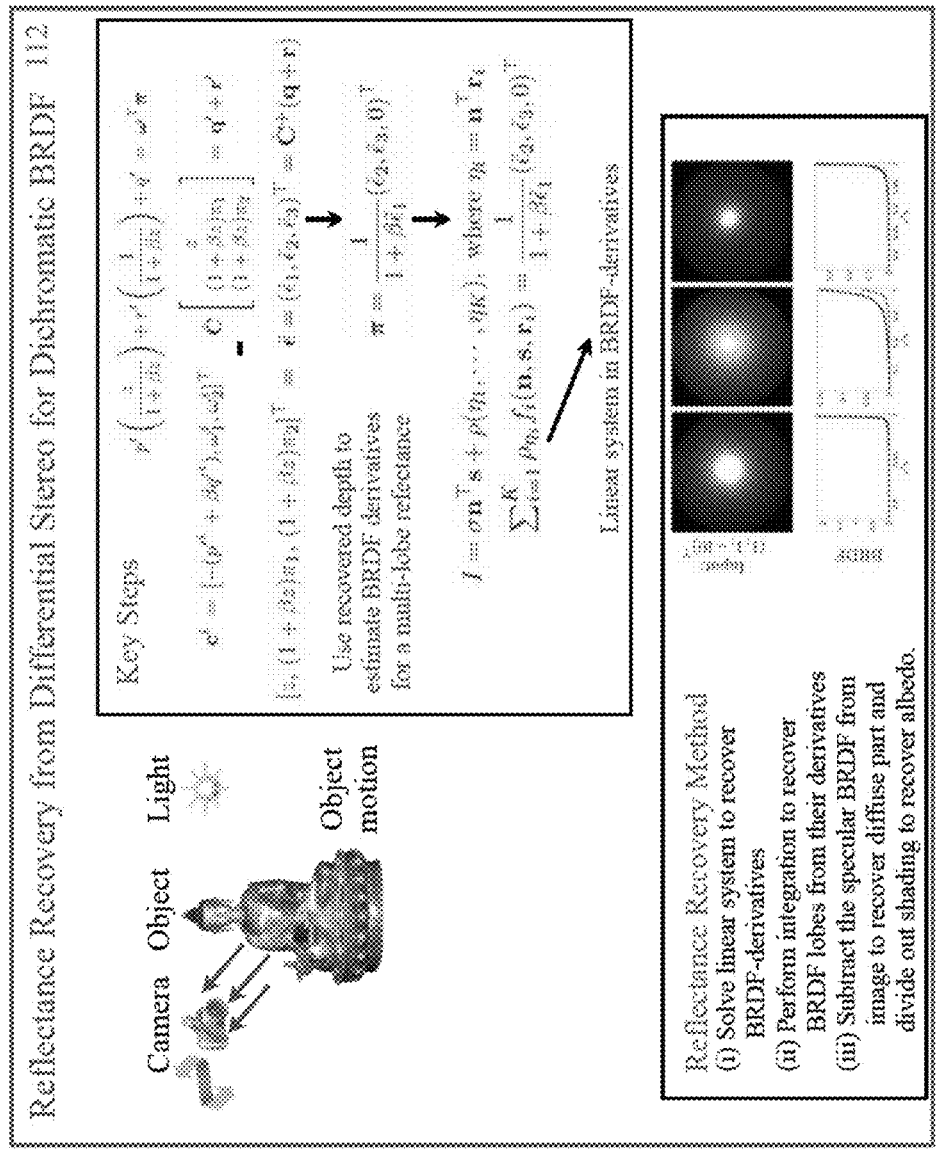
Figure 6:
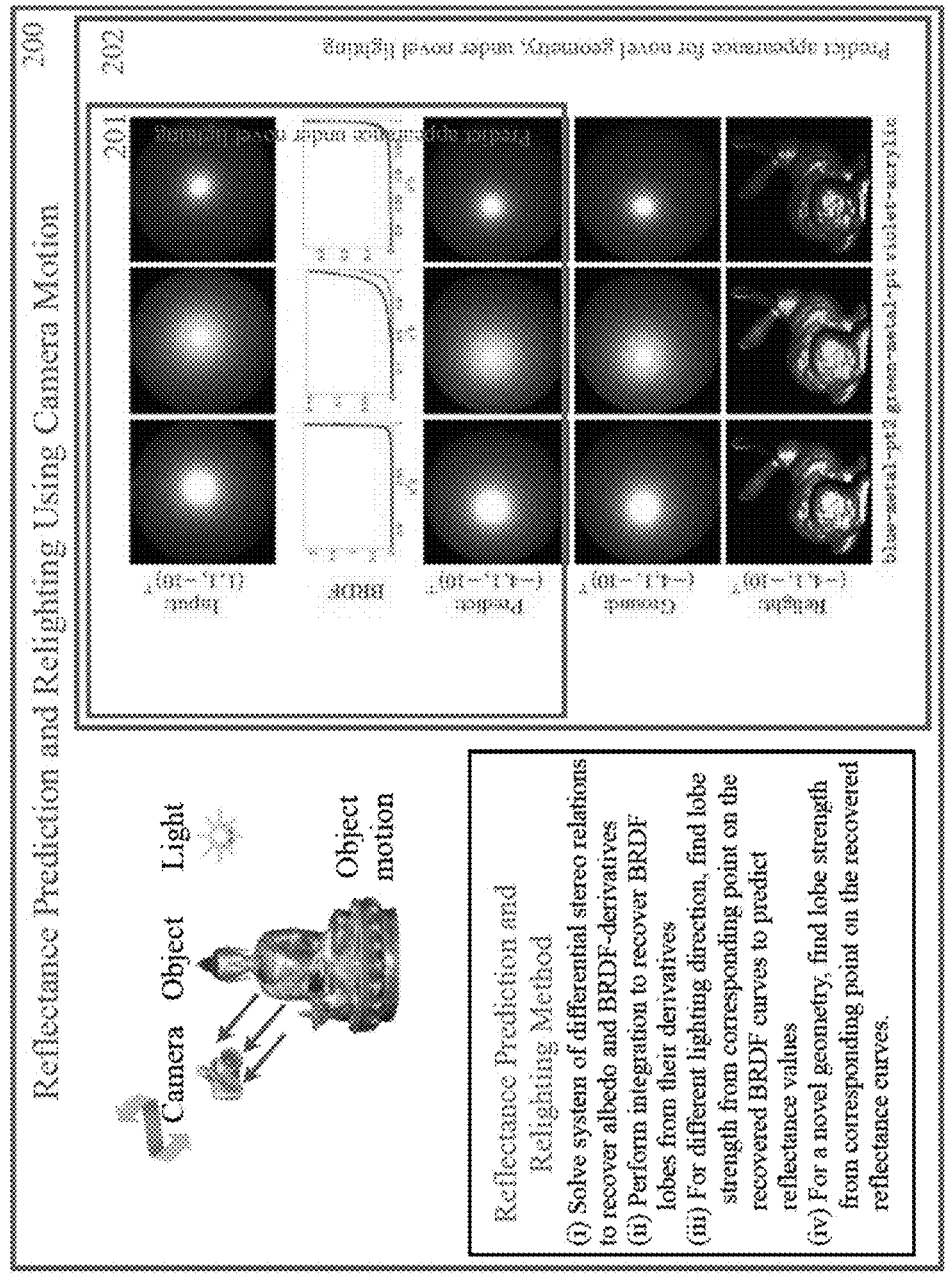

FIGS. 1-6 shows exemplary processes on Shape and Material Recovery from Motion. Traditional optical flow to recover shape from object motion relies on diffuse reflectance and brightness constancy. In contrast, viewing FIGS. 1-4 in combination, our methods derive a differential flow relation for general dichromatic BRDFs and relate it to the surface depth (100). We observe a rank deficiency in this relation across different images. This rank deficiency can be exploited to recover depth, as well as the unknown reflectance (101). The BRDF is unknown. The light direction is unknown. Then, we show that using 4 or more differential motions of the object, we may eliminate BRDF terms to recover surface depth (111). The BRDF is unknown and assumed to be composed of a sum of dichromatic lobes. Then, we show that using 4 or more differential motions of the object, we may derive a linear system in the albedo and BRDF-derivatives. This linear system can be solved to recover the albedo and BRDF (112). Given images of an object of unknown shape, with an unknown dichromatic BRDF, observed as the object moves, we estimate its shape and reflectance using (111) and (112). This can be used for appearance prediction and relighting applications (200).

Under novel lighting, we can determine the point on the BRDF-curve corresponding to the reflectance of a surface point. This is used to predict the appearance of the object under novel lighting (201). For an object with novel geometry, observed under novel lighting, we can determine the point on the BRDF-curve corresponding to the reflectance of each surface point. This is used to relight the novel object under novel lighting (202).

The above framework helps in understanding how cues from object or camera motion govern shape, BRDF and lighting recovery. We show that a few (three or four) motions allow shape recovery with unknown isotropic BRDF and lighting, allow simultaneous shape and BRDF recovery for common materials like metals or plastics, or lead to a well-posed problem for joint recovery of shape, reflectance and directional lighting for such materials.

The appearance of many real-world materials is governed by a dichromatic model, which consists of a diffuse albedo and a non-diffuse reflectance that is a function of surface orientation, lighting and viewpoint. In our system, change in image intensities for isotropic dichromatic materials, for both the cases of object and camera motion, may be linearly related to entities associated with shape, reflectance and lighting. We call these differential flow and stereo relations, respectively.

A direct consequence of this linearity is that shape and reflectance terms are neatly decoupled by motion cues over an image sequence. Using our system, four differential object motions, or three camera motions, suffice to recover surface depth and in many cases, the unknown BRDF as well. This is surprising, since the BRDF can encode complex interactions between shape and lighting. The immediate practical benefit is that we may recover both shape and reflectance without resort to unstable alternating methods, iterative optimization, or restrictive priors on geometry and reflectance.

Another benefit is that our analysis relates the precise extent of shape and BRDF recovery to the hardness of estimation conditions. The well-posedness of shape and reflectance recovery relates to BRDF complexity, as well as to input conditions such as knowledge of lighting or uniform albedo. In the general isotropic case, we show that BRDF may not be estimated using motion cues alone, which justifies several works that impose priors for reflectance recovery. However, when the BRDF depends on one or more angles about the normal—for example, half-angle BRDFs for many metals, plastics or paints—we show that both shape and BRDF may be unambiguously recovered.

In implementations, we assume that the lighting is directional and distant, while the BRDF is isotropic and homogeneous (or having slow spatial variation). Global illumination effects like interreflections and shadows are assumed negligible. The origin of 3D coordinates is defined as the principal point on the image plane. So, the camera center is $(0,0,-f)^T$, where f is the focal length. The image of a 3D point $x=(x,y,z)^T$ is given by a point $u=(u,v)^T$ on the image plane, with $$(1+\beta z)u=x, (1+\beta z)v=y, \text{ where } \beta=f^{-1}. \quad (1)$$

In the case of object motion, we assume the object undergoes rotation R and translation τ relative to camera. For a camera motion $\{R^T, -R^T\tau\}$, the object and lighting are equivalently assumed to undergo a relative motion of $\{R, \tau\}$. In either case, for differential motion, we approximate $R \approx I+[\omega]_x$, where $\omega=(\omega_1, \omega_2, \omega_3)^T$ and $[\cdot]_x$ denotes the cross-product operator.

The motion field μ is the image velocity, that is, $\mu=(\dot{u},\dot{v})^T$. Substituting from (1), with $\alpha_i$ we obtain $$\mu=(1+\beta z)^{-1}[\alpha_1(1+\beta z)+(\alpha_2+\omega_2 z), \alpha_3(1+\beta z)+(\alpha_4-\omega_1 z)]^T. \quad (2)$$

For surface normal n, light source s and viewing direction v, the dichromatic imaging model at a surface point x is $$I(u,t)=\sigma(x)n^T s+\rho(x,n,s,v), \quad (3)$$

where σ is the diffuse albedo and ρ is the BRDF. Such models closely approximate real-world materials. Parametric models like Torrance-Sparrow are often used to model ρ, but this work considers the form of ρ unknown.

We now derive differential relations between shape and reflectance, induced by motion. Consider the setup where the camera and lighting are fixed, while the object moves relative to the camera. Since the light position s does not change with time, we may write the BRDF of a point as a function of its position and normal, that is, ρ(x,n). Taking the total derivative on both sides of (3), we get $$I_u \dot{u} + I_v \dot{v} + I_t = \sigma \frac{d}{dt}(n^T s) + (n^T s)\frac{d\sigma}{dt} + \frac{d}{dt}\rho(x,n). \quad (4)$$

Since albedo is intrinsically defined on surface coordinates, its total derivative in 3D coordinates vanishes. For rigid body motion, change in normal is given by $\dot{n}=\omega\times n$, while change in position is the linear velocity, $\dot{x}=v$. Using chain rule differentiation and recognizing $\mu=(\dot{u},\dot{v})^T$ as the motion field, we have $$(\nabla I)^T \mu + I_t = (\sigma s + \nabla_n \rho)^T(\omega \times n) + (\nabla_x \rho)^T v. \quad (5)$$

In our setup, the BRDF is homogeneous and lighting is distant, thus, $\nabla_x \rho$ is negligible. Thus, we obtain the following relation:

$$(\nabla_u I)^T \mu + I_t = [n\times(\sigma s+\nabla_n \rho)]^T \omega. \quad (6)$$

We call this the differential flow relation. However, the above is a relation for dichromatic BRDFs. For now, we make an observation which will be used later: For an object with dichromatic BRDF undergoing differential motion, a differential flow relation exists that is linear in entities that depend on shape (motion field and surface normals), reflectance and lighting.

Next, a similar analysis for the case of camera motion shows the existence of a differential stereo relation:

$$(\nabla_u I)^T \mu + I_t = (n\times\nabla_n\rho + s\times\nabla_s\rho)^T \omega. \quad (7)$$

We again observe a similarity to the monochromatic case, while noting: For an object with dichromatic BRDF observed by a camera undergoing differential motion, a differential stereo relation exists that is linear in entities that depend on shape, reflectance and lighting.

The above linearities ensconced within the differential flow and stereo relations play a key role in understanding the limits of both shape and reflectance recovery using motion cues.

Next, we establish shape recovery from motion cues, with unknown dichromatic BRDF. Further, we may assume the lighting to also be unknown.

Substituting the motion field (2) into the differential flow relation (6), we obtain $$(p+\beta q)z+(q+r)=(1+\beta z)\omega^T \pi, \quad (8)$$

where $p=I_u \omega_2 - I_v \omega_1$, $q=\alpha_1 I_u + \alpha_3 I_v + I_t$ and $r=\alpha_2 I_u + \alpha_4 I_v$ are known and $$\pi=n\times(\sigma s+\nabla_n \rho). \quad (9)$$

We are now in a position to state the following: Four or more differential motions of a surface with unknown dichromatic BRDF, under unknown light direction, suffice to yield surface depth.

For $m\geq 4$, let known motions $\{\omega_i, \tau^i\}$, where $\omega_i$ span $R^3$, relate images $I_1, \ldots, I_m$ to $I_0$. From (8), we have a sequence of differential flow relations $$(p^i+\beta q^i)z-(1+\beta z)\pi^T \omega^i+(q^i+r^i)=0, \text{ for } i=1,\ldots,m. \quad (10)$$

Let $c^i=[p^i+\beta q^i, -\omega_1^i, -\omega_2^i, -\omega_3^i]^T$ be rows of the m×4 matrix $C=[c^1, \ldots, c^m]^T$. Let $q=[q^1, \ldots, q^m]^T$ and $r=[r^1, \ldots, r^m]^T$. Define $\epsilon=-C^+(q+r)$, where $C^+$ is the Moore-Penrose pseudoinverse of C and let $\epsilon'=(\epsilon_2,\epsilon_3,\epsilon_4)^T$. Then, we have $$z=\epsilon_1 \quad (11)$$

$$(1+\beta z)\pi=\epsilon'. \quad (12)$$

Thus, from (11), we have obtained the surface depth.

We again start by observing that substituting the motion field (2) in the differential stereo relation (7) leads to an equation of the form (8). However, note that the definition of $\pi$ is different for the case of camera motion. Indeed, an isotropic BRDF may be written as $\rho(n,s,v)=\bar{\rho}(n^T s, s^T v, n^T v)$, whereby $$\pi = n \times \nabla_n \rho + s \times \nabla_s \rho = \bar{\rho}_n T_v(n \times v) + \bar{\rho}_s T_v(s \times v), \quad (13)$$

thus, $\pi^T v = \pi_3 = 0$. Using $m \geq 3$ differential motions $\{\omega^i, \tau^i\}$, one may define the $m \times 3$ matrix $\tilde{C} = [\tilde{c}^1, \ldots, \tilde{c}^m]^T$ with rows $\tilde{c}^i = [-(p^{ii}+\beta q^{ii}), \omega_1^i, \omega_2^i]^T$. Then, the system of m differential stereo relations (10) may be solved to obtain $$[z, (1+\beta z)\pi_1, (1+\beta z)\pi_2]^T = \tilde{\epsilon}, \quad (14)$$

where $\tilde{\epsilon} = (\tilde{\epsilon}_1, \tilde{\epsilon}_2, \tilde{\epsilon}_3)^T = \tilde{C}^+(q+r)$, with q and r as defined previously. It follows that $z = \tilde{\epsilon}_1$ yields the surface depth. Thus, we have shown: Three or more differential motions of the camera suffice to yield depth of a surface with unknown dichromatic BRDF and unknown light direction.

We observe that even with the assumption of a dichromatic BRDF, the shape recovery results are similar to the monochromatic cases. Indeed, the overall forms of the differential flow and stereo relations exhibit similar linearities. Intuitively, this leads to similar shape recovery results.

But more importantly, we note an additional benefit of the linear relationship between shape and BRDF in the differential flow and stereo relations. Namely, in (12) and (14), we also obtain information about the BRDF in the form of $\pi$. Our focus next will be on how the differential flow and stereo relations aid understanding of reflectance recovery.

We now consider the problem of simultaneous shape and reflectance recovery. For both the cases of object and camera motion, in addition to the shape, we have obtained information about the reflectance in (12) and (14):

$$\text{Object: } \pi = \frac{1}{1+\beta \epsilon_1}(\epsilon_2, \epsilon_3, \epsilon_4)^T, \quad (15)$$

$$\text{Camera: } \pi = \frac{1}{1+\beta \tilde{\epsilon}_1}(\tilde{\epsilon}_2, \tilde{\epsilon}_3, 0)^T.$$

It is interesting that shape and reflectance may be decoupled using motion cues, despite the complex interactions enabled by an unknown dichromatic BRDF. We now show how the linearity of differential flow and stereo allows us to impose limits on the extent to which BRDF may be recovered using motion cues. In this section, we will assume a known light source direction.

Using $m \geq 4$ motions of an object, we may always obtain the shape. We will now explore the extent to which BRDF may be recovered.

For an isotropic BRDF, image formation depends on the three angles between surface normal, camera and lighting directions:

$$I = \sigma n^T s + \rho(\theta, \phi, \psi), \text{ where } \theta = n^T s, \phi = s^T v \text{ and } \psi = n^T v. \quad (16)$$

Using (9) to define $\pi$ and substituting in (12), we have the following relation:

$$(1+\beta z) n \times [(\sigma + \rho_\theta)s + \rho_\psi v] = \epsilon', \quad (17)$$

where $\rho_\phi = 0$ since $\phi$ remains unchanged for object motion. Further, the albedo and BRDF-derivative along the $\theta$ direction, $\rho_\theta$, cannot be disambiguated. This can also be intuitively understood since $\rho$ is an arbitrary function and may ambiguously incorporate any information about $\theta$ that is included in the diffuse term. Thus, only BRDF variation along $\psi$ is captured by object motion.

Even though estimation of a dichromatic BRDF from object motion is ambiguous in the fully general case, we show that it is unique for more restricted BRDFs exhibited by several real-world materials.

For many materials, the reflectance depends predominantly on the angle between the surface normals and a single reflection direction, r. Most commonly, such as with metals, plastics and many paints, the reflection direction is aligned with the half-angle between the source and viewing directions. This observation has also been used to propose parametric models. For many materials in the MERL dataset, empirical studies have found a single lobe BRDF to be sufficiently descriptive. For such materials, we show: Four or more differential motions of an object with single-lobe dichromatic BRDF suffice to uniquely determine its shape, albedo and reflectance.

The image formation for an object with single-lobe BRDF is given by $I = \sigma n^T s + \rho(\eta)$, where $\eta = n^T r$. Substituting in (9), we obtain $$\pi = n \times (\sigma s + \nabla_n \rho) = n \times (\sigma s + \rho_\eta r). \quad (18)$$

Given images under four or more differential motions, the existence of a relation between depth and reflectance is:

$$(1+\beta \epsilon_1)[n(\epsilon_1) \times (\sigma s + \rho_\eta r)] = \epsilon', \quad (19)$$

where the normals $n(\epsilon_1)$ are obtained from the derivatives of surface depth estimated in (11). Thus, the above is a rank 2 system of three linear equations in the two unknowns $\sigma$ and $\rho_\eta$, which may both be recovered. Finally, we note that for most materials, reflection vanishes around grazing angles (indeed, the non-diffuse component of half-angle BRDFs is often super-linear). Thus, $\rho(0)=0$, whereby $\rho_\eta$ may be integrated to recover the BRDF function $\rho$.

Thus, we have shown that for a large class of dichromatic materials, motion cues alone can determine all of shape, albedo and BRDF. Intuitively, the linear separability of shape and reflectance allows us to determine conditions when BRDF is recoverable. Further, it also allows us to determine when BRDF estimation is ambiguous, as discussed next.

The result relies on the direction r being distinct from the light source s, otherwise (19) reduces to: $(1+\beta \epsilon_1)[n(\epsilon_1) \times (\sigma + \rho_\eta)s] = \epsilon'$. Clearly, in this case, one may not independently recover both albedo $\sigma$ and the BRDF-derivative $\sigma_\eta$. For most materials, it is indeed the case that $r \neq s$ (for instance, r is often the half-angle). However, there are two important exceptions. First, an object with arbitrary isotropic BRDF observed under colocated illumination follows an image formation model given by $I = \sigma n^T s + \bar{\rho}(n^T s)$ (since s=v and PsP=1, there exists a function $\bar{\rho}$ such that $\rho(n^T s, s^T v, n^T v) = \bar{\rho}(n^T s)$). Second, retroreflective materials such as those used to enhance visibility of road signs reflect light back towards the source direction. Thus, we may state: Albedo and reflectance cannot be disambiguated using motion cues for an object with retroreflective BRDF or one observed under colocated lighting.

For some materials, the image may be explained by reflection along two or more angles with respect to the surface normal. That is, $$I = \sigma n^T s + \rho(\eta_1, \ldots, \eta_K), \text{ where } \eta_i = n^T r_i, \text{ for } i=1, \ldots, K, \quad (20)$$

where $K \geq 2$. Empirical studies show that accounting for BRDF dependence on a second direction besides the half-angle leads to a better approximation for materials like veneer paints and fabrics. We will refer to directions $\eta_i$ as lobes.

Given four or more differential motions, shape may be recovered for such BRDFs using Substituting from (20) into the expression for $\pi$ in (9) and using (15), we obtain a relation between depth and reflectance:

$$(1+\beta\varepsilon_1)n(\varepsilon_1)\times\left(\sigma s+\sum_{i=1}^{K}\rho_{\eta_i}r_i\right)=\varepsilon', \quad (21)$$

which is a system of three linear equations in K+1 unknowns $\{\sigma, \rho_{\eta_1}, \ldots, \rho_{\eta_K}\}$. For K>2, clearly the system (21) is underdetermined and no unique solution is possible. For K=2, the above is a system of three linear equations in three unknowns $\sigma, \rho_{\eta_1}$, and $\rho_{\eta_2}$. However, note that the 3×3 matrix associated with the system in (21), A=(n×s,n×r,n×r$_2$), is rank-deficient. Thus, we state: A K-lobe BRDF may not be recovered using object motion alone for an object with unknown albedo when K≥2 (although shape may be recovered). It is interesting that the above ambiguity also affects important classes of parametric BRDFs. An example is the Torrance-Sparrow model ignoring geometric attenuation and Fresnel terms, for which image formation may be expressed as $$I=\sigma n^T s+\rho(n^T h, n^T v), \quad \text{with} \quad \rho:(n^T v)^{-1}\exp(-\lambda^2(\cos^{-1}n^T h)^2), \quad (22)$$

where $\lambda$ is a surface roughness parameter.

We now consider the important case of known albedo. Note that uniform albedo, which is a common assumption in BRDF acquisition and estimation settings, reduces to known albedo when the non-diffuse components of a dichromatic BRDF are super-linear and rapidly diminish away from the lobe directions, as is true for most materials. Since the matrix A defined above is rank 2, the remaining unknowns $\rho_{\eta_1}$ and $\rho_{\eta_2}$ may still be recovered when the albedo is known. Thus, we have: With known albedo, both shape and a BRDF with up to two lobes may be recovered using four or more differential motions of the object.

Finally, we note that with K≥3 lobes, even with known albedo, the above rank 2 system of equations is underdetermined, so we state: Object motion cannot disambiguate the estimation of a BRDF with K≥3 lobes, even with known albedo (although shape may still be recovered).

We now briefly study the case of camera motion. We have seen in (15) that m≥3 motions determine the entity $\pi$ that encodes BRDF-derivatives. We specify what BRDF information may be recovered from $\pi$, given its form in (7):

$$\pi=n\times\nabla_n\rho+s\times\nabla_s\rho. \quad (23)$$

Recall from (13) that for any isotropic BRDF where $\rho(n,s,v)=\bar{\rho}(n^T s, s^T v, n^T v)$, the BRDF-derivative $\bar{\rho}_{n^T s}$ vanishes. Thus, a full isotropic BRDF may not be recovered using camera motion. However, one may still recover restricted forms of isotropic BRDFs, such as the K-lobe model, as shown next.

It also follows from (13) that $\pi^T v=\pi_3=0$. Thus, only two independent constraints on the BRDF are available through differential motion of the camera. Consider a K-lobe image formation $I=\sigma n^T s+\rho(\eta_1, \ldots, \eta_K)$, where $\eta_i=n^T r_i$. From the linearity of differentiation, $\pi_j$ are of the form $\sum_{i=1}^{K}\rho_{\eta_i}f_i^j(n,s,r_i)$, for some analytic functions $f_i^j$ and j=1,2. Clearly, for K>2, one may not determine all the $\rho_{\eta_i}$, since only two constraints on $\pi$ are available. Further, note that there is no dependence of $\pi$ on $\sigma$, unlike the case of object motion. Thus, for K=2, when $r_1$ and $r_2$ are independent and "general" (that is, with no special dependencies for $f_i$), both $\rho_{\eta_1}$ and $\rho_{\eta_2}$ may be determined. Thus, the BRDF $\rho$ can be recovered by integration. For known lighting, the albedo may subsequently be estimated by subtracting the non-diffuse component. Thus, we have: Three or more differential motions of the camera suffice to uniquely determine the shape, albedo and reflectance of an object with a general K-lobe dichromatic BRDF, for K≤2.

An important exception is the case of retroreflection, when one may have $\eta_i=n^T s$. From the symmetry of the expression for $\pi$ in (23), it follows that $\rho_{\eta_i}=0$. Consequently, the BRDF may not be uniquely determined in this case.

We now consider the problem of jointly recovering shape, reflectance and lighting using motion cues (for convenience, "light direction" in this section also refers to the reflection directions). We show that the linear separability of shape, reflectance and lighting allows a characterization of the hardness of such joint recovery problems.

For a BRDF dependent on K reflection directions, image formation is given by (20) and shape recovered as $z=\varepsilon_1$. Three additional equations of the form (21) are available relating the remaining unknowns $\{\sigma, \rho_{\eta_1}, \ldots, \rho_{\eta_K}, s, r_1, \ldots, r_K\}$, reproduced here for convenience:

$$[n(\varepsilon_1)]_\times\left(\sigma s+\sum_{i=1}^{K}\rho_{\eta_i}r_i\right)=\frac{\varepsilon'}{1+\beta\varepsilon_1}. \quad (24)$$

Since $[n(\varepsilon_1)]_\times$ is skew-symmetric, only two of the three relations in (24) are independent. Thus, for N pixels (or more precisely, N independent normals), we have 2N equations in (K+1)(N+2) unknowns (N unknowns for each of albedo and BRDF-derivatives, two unknowns for each direction). Clearly, the system of equations (24) is underdetermined for any K≥1.

Thus, we may state: With unknown albedo and non-Lambertian dichromatic BRDF, the problem of joint recovery of shape, reflectance and lighting using object motion is underconstrained.

Considering image formation in (20) dependent on a K-lobe BRDF, shape may always be recovered. By definition in (23), $\pi$ is independent of albedo. From the definitions of $\pi$ in (15) and (23), the relations for camera motion corresponding to (24) are of the form $$\sum_{i=1}^{K}\rho_{\eta_i}f_i^j(n(\varepsilon_1),s,r_i)=\frac{\tilde{\varepsilon}_{j+1}}{1+\beta\varepsilon_1}, \quad (25)$$

for known functions $f_i^j$ and j = 1, 2.

Since $\pi_3=0$ by definition in (15), only two independent relations are available. Thus, for N pixels, we have 2N equations in K(N+2)+2 unknowns. With unknown albedo and a K-lobe dichromatic BRDF, the problem of joint recovery of shape, reflectance and lighting using camera motion is well-posed for K≤1 and ill-posed for K>1. This is a surprising result, since joint recovery of shape, reflectance and lighting has traditionally been considered hard. The above shows that even beyond the traditionally studied Lambertian cases, for many common materials like metals and plastics whose BRDF shows a strong half-angle dependence (K=1), there are enough constraints available to solve such joint recovery problems.

For a BRDF with two lobes, we have 2N+6 unknowns, so the system (25) is only mildly ill-posed and may be solved for shape, reflectance and lighting under regularization. Finally, we note that the problem is severely ill-posed for K>2.

We have presented a framework that helps understand the extent to which object or camera motion cues enable recovery of shape, reflectance and lighting. Test results reflect the intrinsic difficulty of shape and reflectance recovery from motion cues, independent of choice of estimation method. Our framework yields some surprising results on shape and reflectance recovery. In particular, we show both theoretically and in experiments that motion cues can decouple shape and BRDF, allowing both to be simultaneously (rather than alternatingly) estimated for many common materials. Even more unexpectedly, it can be shown that under camera motion, joint recovery of shape, albedo, reflectance functions, lighting and reflection directions is well-posed for some materials (and only mildly ill-posed under object motion). Estimation processes can be used to exploit this well-posedness for joint recovery of shape, reflectance and lighting.

The system can recover both the unknown shape and reflectance of an object with dichromatic BRDF, using motion cues. Using the (small or differential) motion of either the object or the camera, intensity change depends on motion through a relation that is linear in shape, reflectance and lighting, obviating the need for unstable or expensive alternating estimation. Precise theoretical conditions may be delineated that place limits on shape and reflectance recovery using motion cues, regardless of choice of estimation method. While shape may be recovered for a full isotropic BRDF even with unknown lighting for both object and camera motions, reflectance estimation is shown to be ambiguous using motion cues alone. BRDFs representing common materials like metals, plastics and paints can be recovered, even with unknown shape. Our system generalizes or extends prior works that assume monochromatic BRDF for shape recovery, or estimate BRDF using a single image or known shape. Experiments on real measured BRDFs from the MERL database validate our theory.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for shape and material recovery for an object observed by a moving camera, comprising:
   detecting a change in image intensity induced by camera motion to corresponding variation in surface geometry and dichromatic reflectance;
   receiving a sequence of three or more camera motions to yield a linear system that decouples shape and bidirectional reflectance distribution functions (BRDF) terms;
   applying linearities in differential stereo relations to recover shape from camera motion cues, with unknown lighting and unknown dichromatic BRDFs; and
   recovering unknown shape and reflectance of the object with dichromatic BRDF, using camera motion cues;
   wherein the BRDF is unknown and composed of a sum of dichromatic lobes, comprising using three or more differential motions of the camera to derive a linear system in an albedo and BRDF-derivatives.

2. The method of claim 1, comprising applying recovered shape and reflectance functions to predict object appearance under novel lighting and relight objects of novel shapes under novel lighting.

3. The method of claim 1, comprising deriving a differential stereo relation for dichromatic BRDFs and relating the differential stereo relation to surface depth.

4. The method of claim 1, comprising determining a rank deficiency in the differential stereo relation across different images.

5. The method of claim 1, comprising using the rank deficiency to recover depth and unknown reflectance.

6. The method of claim 1, wherein the BRDF and light direction are unknown, comprising using 3 or more differential motions of the camera to eliminate BRDF terms to recover surface depth.

7. The method of claim 1, comprising using the linear system to recover the albedo and BRDF.

8. The method of claim 1, given images of an object of unknown shape, with an unknown dichromatic BRDF, observed as the camera moves, comprising estimating shape and reflectance for appearance prediction and relighting application.

9. The method of claim 1, comprising determining a point on the BRDF-curve corresponding to the reflectance of a surface point under predetermined lighting.

10. The method of claim 9, comprising predicting an appearance of the object under predetermined lighting.

11. The method of claim 1, for an object with predetermined geometry, observed under predetermined lighting, comprising determining a point on the BRDF-curve corresponding to the reflectance of each surface point.

12. The method of claim 11, comprising relighting the object under predetermined lighting.

13. The method of claim 1, comprising modelling dichromatic dependence of surface reflectance on surface normal, lighting and viewing directions to derive a differential stereo relation.

14. The method of claim 1, comprising reconstructing depth of objects that reflect light without the BRDFs for shape recovery.

15. A method for shape and material recovery for an object observed by a moving camera, comprising:

detecting a change in image intensity induced by camera motion to corresponding variation in surface geometry and dichromatic reflectance;

receiving a sequence of three or more camera motions to yield a linear system that decouples shape and bidirectional reflectance distribution functions (BRDF) terms;

applying linearities in differential stereo relations to recover shape from camera motion cues, with unknown lighting and unknown dichromatic BRDFs;

recovering unknown shape and reflectance of the object with dichromatic BRDF, using camera motion cues; and determining a rank deficiency in a sequence of differential stereo relations and use the rank deficiency to handle complex BRDFs.

16. A method for shape and material recovery for an object observed by a moving camera, comprising:

detecting a change in image intensity induced by camera motion to corresponding variation in surface geometry and dichromatic reflectance;

receiving a sequence of three or more camera motions to yield a linear system that decouples shape and bidirectional reflectance distribution functions (BRDF) terms;

applying linearities in differential stereo relations to recover shape from camera motion cues, with unknown lighting and unknown dichromatic BRDFs;

recovering unknown shape and reflectance of the object with dichromatic BRDF, using camera motion cues;

estimating BRDF-derivatives from the differential stereo relations to recover the complex BRDF.

* * * * *